United States Patent
Klasen et al.

[11] Patent Number: 5,632,965
[45] Date of Patent: May 27, 1997

[54] METHOD FOR THE PREPARATION OF STABILIZED SODIUM PERCARBONATE

[75] Inventors: Claas-Juergen Klasen, Freigericht; Birgit Bertsch-Frank, Rheinfelden; Thomas Lieser, Hanau; Peter Schubert, Grenzach-Wyhlen; Klaus Mueller, Hasselroth, all of Germany

[73] Assignee: Degussa Aktiengesellschaft, Frankfurt, Germany

[21] Appl. No.: 507,279

[22] PCT Filed: Feb. 15, 1994

[86] PCT No.: PCT/EP94/00422

§ 371 Date: Sep. 28, 1995

§ 102(e) Date: Sep. 28, 1995

[87] PCT Pub. No.: WO94/20413

PCT Pub. Date: Sep. 15, 1994

[30] Foreign Application Priority Data

Mar. 2, 1993 [DE] Germany .......................... 43 06 399.3

[51] Int. Cl.[6] .................................................. C01B 31/24
[52] U.S. Cl. ........................................ 423/274; 423/415.2
[58] Field of Search ............................. 423/415.2, 274

[56] References Cited

U.S. PATENT DOCUMENTS

| 4,194,025 | 3/1980 | Klebe et al. | 252/99 |
|---|---|---|---|
| 5,366,655 | 11/1994 | Yamashita et al. | 423/415.2 |

FOREIGN PATENT DOCUMENTS

| 0487256 | 5/1992 | European Pat. Off. |
|---|---|---|
| 2528447 | 12/1983 | France . |
| 548432 | 4/1932 | Germany . |
| 24 17 572 | 11/1974 | Germany . |
| 24 58 326 | 7/1975 | Germany . |
| 26 22 610 | 12/1976 | Germany . |
| 26 52 776 | 5/1978 | Germany . |
| 26 51 442 | 6/1978 | Germany . |
| 28 00 916 | 7/1978 | Germany . |
| 27 12 139 | 9/1978 | Germany . |
| 2 800 760 | 7/1979 | Germany . |
| 2810379 | 9/1979 | Germany . |
| 33 21 082 | 12/1983 | Germany . |
| 3720277 | 12/1988 | Germany . |
| 118606 | 6/1985 | Japan .................... 423/415.2 |
| 1575792 | 10/1980 | United Kingdom . |

*Primary Examiner*—Wayne Langel
*Attorney, Agent, or Firm*—Beveridge, DeGrandi, Weilacher & Young, L.L.P.

[57] ABSTRACT

The invention relates to a method for increasing the storage stability of sodium percarbonate (2 $Na_2CO_3 \cdot 3\ H_2O_2$) by coating with a sodium perborate.

According to the present invention wet sodium percarbonate salt, obtained by reacting sodium carbonate with hydrogen peroxide in aqueous phase and separating the salt from the aqueous phase, is treated with a solution or suspension containing sodium perborate in a solid-liquid separator by a kind of displacement wash. In contrast to previously known methods, according to the present invention a greater storage stability is attained with smaller quantities of perborate coating.

19 Claims, No Drawings

METHOD FOR THE PREPARATION OF STABILIZED SODIUM PERCARBONATE

DESCRIPTION

The invention relates to a method for the preparation of stabilised sodium percarbonate consisting of a sodium percarbonate core and a coating containing sodium perborate of the formula $NaBO_2.H_2O_2.nH_2O$, wherein n is 0, 1, 2 or 3. The method according to the present invention allows good storage stability to be attained, notwithstanding a small quantity of coating material.

Sodium percarbonate ($2\ Na_2CO_3.3\ H_2O_2$) is used as an active oxygen component in washing agents, bleaches and cleaning materials. Owing to its unsatisfactory storage stability in a warm, damp environment and in the presence of various washing agent components and cleaning material components, sodium percarbonate must be stabilised. An essential principle of stabilisation is to surround the particles of sodium percarbonate with a coating of stabilising components.

Thus the coating of sodium percarbonate with paraffin or polyethylene glycol is well-known. However adequate long-term stability is not achieved through this and besides the solubility in water is reduced in an undesirable manner. The formation of an alkali silicate coat on the particles of sodium percarbonate, as is proposed in DE-OS 26 52 776, also results in inadequate stabilisation and also to an undesirable proportion of insoluble constituents. According to the methods known from DE-OS 24 17 572 or DE-OS 26 22 610, sodium sulphate and sodium carbonate, or sodium sulphate, sodium carbonate and sodium silicate are used as coating components, wherein the methods are based on spraying a solution of the coating components onto particles of sodium percarbonate in a fluidised bed drier. For stabilisation in practice a quantity of coating material of at least 3% by weight, but in most cases definitely in excess of this, is required.

While the use of a coating material containing at least one boron compound from the group comprising metaboric acid, orthoboric acid and tetraboric acid for the stabilisation of sodium percarbonate is known from DE-PS 28 00 916, the stabilising action attainable thereby is shown in the comparative examples given in DE-OS 33 21 082 to be inadequate and in contrast to that sodium percarbonate with a coating containing sodium borate, in particular sodium metaborate, is presented in that patent as being advantageous. As the inventors of the present application established when reworking the examples from DE-OS 33 21 082, in order to achieve an adequate stability the coating had to contain borate in a quantity such that the boron content of the sodium percarbonate stabilised in this way amounted to at least 0.4% by weight, however the available active oxygen content of the stabilised sodium percarbonate was consequently each time clearly less than 14% by weight. A further development in stabilisation using borates is described in EP-A 0 487 256, however the method disclosed therein is in two steps, with a drying stage being required after each step; hence the method is technically expensive.

Finally, DE-AS 24 58 326 discloses a method for stabilising sodium percarbonate, wherein the storage stability of the pure product, as well as mixed with cleaning materials which accelerate decomposition, is increased. Here the sodium percarbonate is coated with a hydrophobic liquid organic compound to which sodium perborate powder is added.

The disadvantage of this method is the necessity of using a hydrophobic liquid organic compound, which, optionally, for the purpose of better handling must be diluted with a lower alcohol. Moreover the quantities of coating chemicals used, namely 5 to 20% by weight of sodium perborate and 5 to 10% by weight of hydrophobic organic compound, calculated respectively by reference to sodium percarbonate, are very high.

Sodium percarbonate layer particles, which consist of a sodium percarbonate core and a coating of sodium perborate, wherein the sodium perborate contains less than 3 moles of water of crystallisation per mole, are known from DE-PS 26 51 442; according to DE-PS 27 12 139, the coating may contain in addition sodium silicate and other hygroscopic substances. To prepare the said sodium percarbonate layer particles, sodium percarbonate is first of all wetted with water or with an aqueous sodium silicate solution in a quantity too small for the formation of sodium perborate tetrahydrate to be attained and then coated with dehydrated sodium perborate. A further development of the previously outlined method may be quoted from DE-PS 28 10 379: here sodium percarbonate is sprayed with an aqueous solution of sodium perborate containing from 50 to 500 g of sodium perborate tetrahydrate per 1 of solution at 40° to 60° C. and a solution of sodium silicate, and then the water introduced is wholly or partially removed again. As shown by the example in DE-PS 28 10 379, it is not possible to spray the whole required quantity of solution containing perborate onto the centrifuge-damp sodium percarbonate all at once and then to dry it. Rather the solution must be sprayed in several portions, each time with intermediate drying, which considerably impairs the economic efficiency of the method.

The object underlying the present invention is the provision of an improved method for the preparation of stabilised sodium percarbonate having a coating containing sodium perborate which avoids the disadvantages of the typical methods previously known. The method of applying the coating containing sodium perborate should be capable of being integrated without difficulty with previously known methods for the preparation of sodium percarbonate by reacting sodium carbonate with hydrogen peroxide in aqueous phase. A further object is directed to attaining as good a stability as possible with as small a quantity as possible of perborate in the coating.

A method has been found for the preparation of stabilised sodium percarbonate consisting of a sodium percarbonate core and a coating containing sodium perborate of the formula $NaBO_2.H_2O_2.nH_2O$, wherein n is 0, 1, 2 or 3, by the spraying of a wet sodium percarbonate salt, produced in a manner known per se by reacting sodium carbonate with hydrogen peroxide in aqueous phase and separation from the latter, with an aqueous solution or suspension containing sodium perborate, the sodium perborate content of which, expressed as $NaBO_2.H_2O_2$, is from 15 to 450 g/l, and drying at 40° to 90° C., characterised in that the wet sodium percarbonate salt is sprayed with 5 to 100 l of the solution or suspension containing sodium perborate per 100 kg of the wet salt, and excess solution or suspension is separated simultaneously or subsequently in a solid-liquid separator and that, in the case of a suspension containing sodium perborate being used, suspended sodium perborate particles have essentially a smaller particle diameter than the sodium percarbonate particles.

Although $NaBO_2.H_2O_2.nH_2O$ is frequently encountered in the literature as a notation for sodium perborate, in reality it relates to substances of the formula

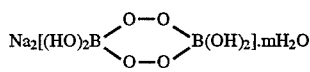

wherein m=0, 2, 4 or 6. m=0 corresponds to $NaBO_2.H_2O_2$, which is generally referred to as sodium perborate monohydrate; m=6 corresponds to $NaBO_2.H_2O_2.3H_2O$, which is generally referred to as sodium perborate tetrahydrate.

The method according to the present invention follows directly on the preparation of sodium percarbonate according to a so-called wet process at the stage of the wet salt, so that only one drying stage is necessary within the overall process. Well-known wet processes for the preparation of sodium percarbonate comprise the reaction of sodium carbonate with hydrogen peroxide in aqueous phase, the crystallisation of the sodium percarbonate thus formed, the separation of the latter from the aqueous phase (mother liquor) and the drying of the wet sodium percarbonate salt. For the preparation of a wet sodium percarbonate salt reference may be made, for example, to DE-PS 28 00 760 and to the documents cited therein. Since all production plants operated according to a wet process always include a device for solid-liquid phase separation and the same device can also be used for the treatment according to the present invention, only small adjustments are required to adapt an existing plant for the preparation of sodium percarbonate by the wet process so that stabilised sodium percarbonate according to the present invention can be prepared.

While in typical previously known methods (DE-PS 28 10 379) the required quantity of spraying solution containing sodium perborate was sprayed in several portions and each one was dried, in the method according to the present invention the application of the perborate-containing coating is carried out in the form of a so-called displacement wash. The mother liquor from the crystallisation process adhering to the wet sodium percarbonate salt is wholly or partially displaced by the solution or suspension containing perborate by separating off excess liquid by means of a solid-liquid separator after, or preferable during, spraying with the solution or suspension. Through this displacement wash, the particles of sodium percarbonate are brought into contact evenly with the solution or suspension containing sodium perborate, so that a complete coating of the particles is possible. At the same time a high storage stability of the coated particles is ensured, although only a small quantity of coating material, by reference to sodium percarbonate, is required to form the coating.

The solution or suspension containing sodium perborate which is used for spraying contains sodium perborate in dissolved form and, in the case of a suspension, in suspended form. The solution preferably to be used, wherein the presence of a small quantity of extremely fine particles is not excluded, is preferably a supersaturated perborate solution. Such a solution can be obtained by bringing together, immediately prior to spraying, an aqueous solution of sodium metaborate and an aqueous solution of hydrogen peroxide in a molar ratio of approximately 1: 1. The two components may be reacted in a reactor or in a static mixer. At a higher concentration of the $NaBO_2$ solution (above 3 mol/l) some warming is necessary (40° to 60° C.); the concentration of the $H_2O_2$ solution is preferably 50 to 70% by weight. Since the reaction (formation of perborate) proceeds exothermically, the temperature rises; under these conditions there is generally no precipitate, which is advantageous in view of the spraying of the reaction solution in the displacement wash.

In the event of a suspension containing suspended sodium perborate being used, the diameter of the particles of the suspended sodium perborate, which in this case is present as sodium perborate tetrahydrate ($NaBO_2.H_2O_2.3H_2O$), should essentially be smaller than the diameter of those of the sodium percarbonate to be coated. In this connection, by the term "essentially" it is understood that the particle diameter of at least 90% of the sodium percarbonate is greater than the particle diameter of the suspended sodium perborate. The diameter of the suspended particles of sodium perborate is preferably very much smaller than the diameter of the particles of sodium percarbonate to be coated. In this manner part of the suspended sodium perborate is precipitated during the displacement wash onto the surface of the sodium percarbonate while the remainder, together with the excess solution, is separated off in the solid-liquid separator. As commercial sodium percarbonate preferably has a grain size essentially greater than 150 μm, it is suitable to use as the spraying solution a suspension containing perborate the particle size of which is smaller than 100 μm. The solution or suspension separated off in the displacement wash may again be used as a spraying solution or suspension after adjusting the desired sodium perborate concentration.

The quantity to be used of aqueous solution or suspension containing sodium perborate and their concentration depend on the stabilisation required. It is particularly preferred to treat wet sodium percarbonate salt, the moisture content of which is generally between 5 and 12% by weight, with 10 to 50 l of spraying solution per 100 kg of wet salt, wherein the content of sodium perborate, expressed as $NaBO_2.H_2O_2$, in the suspension is 200 to 400 g/l.

The required displacement wash according to the present invention may in fact take place in a separate solid-liquid separator, for example a centrifuge or filtering device, but it is however more advantageous to perform the displacement wash in the same apparatus in which the wet sodium percarbonate salt is separated off from the mother liquor of the crystallisation. Here, after maximum separation of the mother liquor, the wet salt is sprayed with the solution or suspension containing perborate; then subsequently, or preferably at the same time, excess solution or suspension is removed by means of the solid-liquid separator. A particularly advantageous embodiment of the invention is to use a screen-conveyor centrifuge or a push-type centrifuge fitted with a washing device as the solid-liquid separator.

Centrifuges of this type generally have at least two compartments, wherein the separation of the wet sodium percarbonate salt from the mother liquor takes place in the first compartment and the displacement wash and removal of the excess solution or suspension takes place in the second.

The suspension or solution containing sodium perborate which is used in the displacement wash may also contain, in addition to sodium perborate, other stabilising coating materials already known from prior art. But sodium perborate is preferably the main component in the spraying solution or suspension. In so far as the solution or suspension removed during the displacement wash is reused following adjustment to the desired sodium perborate content, constituents of the mother liquor from the preparation of the wet sodium percarbonate salt are also present in this solution. It is of advantage to use, together with the solution or suspension containing perborate, a small quantity of known active oxygen stabilisers like, for example, phosphonic acid compounds capable of complex formation, such as were used for example in DE-PS 37 20 277, to reduce the tendency of sodium percarbonate to reagglomerate. While it was necessary in typical previously known methods also to add sodium silicate to the solution containing sodium perborate, in the method according to the present invention this is unnecessary. Hence an alkali silicate-free solution or suspension containing sodium perborate is preferably used, because both the rate of dissolving and the dissolving to give a clear solution of the stabilised sodium percarbonate are affected in an undesirable manner by the presence of alkali silicate in the coating.

The drying of the sodium percarbonate treated with the sodium perborate solution or suspension takes place in a manner known per se, for example, in fluidised bed driers. During the drying process the temperature is preferably operated so that the sodium perborate tetrahydrate ($NaBO_2.H_2O_2.3H_2O$) present on the particles of sodium percarbonate is melted. The melting point of sodium perborate tetrahydrate is in fact 64° C.; however it was established that melting processes are already occurring clearly below this temperature because the sodium perborate tetrahydrate is not present in the coating in a pure form. The drying temperature is preferably maintained at least temporarily above the melting point of the sodium perborate tetrahydrate, so that partial or complete dehydration of the tetrahydrate to the so-called monohydrate ($NaBO_2.H_2O_2$) occurs.

The formation of a uniform coating and hence an effective stabilisation are achieved both through the displacement wash and through the melting process during drying. Surprisingly, the stability of the sodium percarbonate is considerably increased even with a very small quantity of coating material consisting essentially of sodium perborate, in fact perborate equivalent to a quantity of from 0.1 to 0.2% by weight of boron by reference to the stabilised sodium percarbonate. Even in the presence of a phosphate-free, zeolite-containing washing tower powder of a type usual on the market, stabilised sodium percarbonate according to the present invention has a high residual active oxygen content even after prolonged storage under extreme conditions. Through the method according to the present invention it was possible to dispense with the intermediate drying stages necessary in previously known methods; at the same time the boron content in the coat could be further reduced and consequently the active oxygen content of the stabilised sodium percarbonate increased. The method according to the present invention can be integrated without difficulty into existing plants for the production of sodium percarbonate by a wet process and requires only a little extra technical expenditure, namely a facility for the preparation of the solution or suspension containing sodium perborate used in the displacement wash and for recycling of the same.

Example 1 and comparative examples VB1 to VB5.

Wet sodium percarbonate salt was prepared in an operation according to the process described in DE-PS 28 00 760. After reacting sodium carbonate with hydrogen peroxide in a mother liquor containing kitchen salt and sodium hexametaphosphate and crystallising the sodium percarbonate, the latter was separated as far as possible from the mother liquor as a wet salt in the first compartment of a two-chambered screen-conveyor centrifuge.

Flow of sodium carbonate suspension 2600 kg/h with a solid content of 16% by weight, inclination of the drum 20°, centrifugal number approximately 1000 revs/min, differential speed between conveyor and drum 20 revs/min, mesh size of the sieve 0.15 mm, residual moisture of the wet sodium percarbonate salt after leaving the first compartment approximately 10% by weight.

Above the second compartment of the centrifuge the wet salt was sprayed with an aqueous solution by means of a single-component nozzle—for contents of the spraying solution, concentration and volume flow, see Table 1—and simultaneously dehydrated by centrifuging. The centrifuge product from the second compartment was recycled after restoring the content of the coating substances to the initial value by further addition of the appropriate substances.

The product removed from the centrifuge, which had a residual dampness of 7% by weight, was dried in a multi-stage fluidised bed drier with the temperature profile in the fluid bed rising from 40 to between 80° and 85° C.; the product was then cooled.

To assess the stability, samples of sodium percarbonate mixed with a commercial phosphate-free but zeolite-containing washing tower powder (Persil Supra TP)—proportions of mixture 15 to 85—in closed packets (0.4 l) were stored in a climatic test cabinet at a constant temperature of 30° C. and 80% relative humidity. The results of the active oxygen content of mixtures of sodium percarbonate, prepared according to the present invention (Example 1) and for comparison (VB1 to VB5), determined in the usual manner initially and after 4 and 8 weeks in storage, are shown in Table 2.

TABLE 1

| Examples | Contents and concentration of aqueous solution | Quantity of spray (l/h) | Active oxygen content (Oa) (%) (by reference to the sodium percarbonate in the mixture) | | |
|---|---|---|---|---|---|
| | | | After mixing | After 4 wks | After 8 wks |
| VB1 | No washing | 75 | 14.0 | 8.1 | 4.2 |
| VB2 | Washing only with water | 75 | 14.1 | 7.7 | 5.1 |
| VB3 | $MgSO_4.7H_2O$ (400 g/l) | 75 | 13.9 | 7.8 | 4.3 |
| VB4 | Hydroxyethane-diphosphonic acid (75 g/l) | 75 | 14.0 | 8.5 | 5.2 |
| VB5 | Na-hexametaphosphate (350 g/l) | 75 | 14.1 | 9.0 | 6.0 |
| Sample according to Example 1 | Sodium perborate (410 g/l, reported as $NaBO_2.H_2O_2$) | 75 | 14.3 | 11.6 | 8.8 |

Key: VB = Comparative example

In Example 1, a suspension containing suspended sodium perborate was used, wherein the particle size was essentially less than 0.1 mm; apart from sodium perborate, the suspension contained only the constituents conditional on the method dissolved in the mother liquor. Sodium percarbonate stabilised according to the present invention has a considerably higher residual oxygen content after storage than the comparative products not processed according to the present invention.

EXAMPLES 2 to 7

The tests were carried out as in Example 1. The sodium perborate concentration and the volume flow of the spray solution (suspension) were varied; volume flow of the wet salt was as in Example 1. The stability of mixtures in storage was analysed (as described above). The boron content of the stabilised sodium percarbonate was also analysed.

The good stabilisation is attributed to the fact that during the displacement wash all the sodium percarbonate particles in the centrifuge, regardless of particle size or distribution, are in a thin layer uniformly in contact with the coating components, which are at least partially dissolved. In previously known methods using a mixer or in fluidised bed treatment, there is only a certain statistical probability of the particles of sodium percarbonate coming into contact with the coating components; therefore with these methods a larger quantity of coating substance is usually necessary in order to obtain a stabilising effect equal to that of the method according to the present invention.

TABLE 2

| Example number | Volume Flow (l/h) | Concentration (calculated as $NaBO_2.H_2O_2$ in g/l) | Boron content (% by wt) | Oa content (%) (By reference to the sodium percarbonate in the mixture) | | |
|---|---|---|---|---|---|---|
| | | | | After mixing | After 4 wks | After 8 wks |
| 2 | 30 | 30.3 | 0.06 | 14.05 | 9.2 | 5.8 |
| 3 | 75 | 30.3 | 0.12 | 14.15 | 9.5 | 7.2 |
| 4 | 75 | 41.0 | 0.18 | 14.05 | 11.5 | 8.8 |
| 5 | 150 | 30.3 | 0.14 | 14.30 | 10.2 | 8.1 |
| 6 | 200 | 30.3 | 0.14 | 14.20 | 10.1 | 8.0 |
| 7 | 200 | 41.0 | 0.20 | 14.20 | 11.4 | 8.6 |

We claim:

1. A method for the preparation of stabilized sodium percarbonate formed of a sodium percarbonate core and a coating containing sodium perborate of the formula $NaBO2.H_2O_2.nH_2O$, wherein n is 0, 1, 2 or 3 comprising spraying a wet sodium percarbonate salt with 5 to 100 l of the solution or suspension containing sodium perborate per 100 kg of the wet salt, the sodium perborate content of which, expressed as $NaBO_2.H_2O_2$ is from 15 to 450 g/l, and separating excess solution or suspension simultaneously or subsequently from solid.

2. The method according to claim 1 wherein said wet sodium percarbonate salt is prepared by reacting sodium carbonate with hydrogen peroxide in aqueous phase and separating the resulting product from said aqueous phase.

3. The method according to claim 1 further comprising subsequently drying at 40° to 90° C.

4. The method according to claim 1 further comprising that, in the case of a suspension containing sodium perborate being used, suspended sodium perborate particles have essentially a smaller particle diameter than the sodium percarbonate particles.

5. The method according to claim 1, wherein the wet sodium percarbonate salt is sprayed with an aqueous solution or suspension containing sodium perborate, in a quantity of from 10 to 50 l per 1000 kg of wet salt.

6. The method according to claim 5 wherein said wet sodium percarbonate salt is sprayed with an essentially particle-free solution, the sodium perborate content of which is expressed as $NaBO_2.H_2O_2$.

7. The method according to claim 6 wherein said sodium perborate content is approximately 200 to 400 g/l.

8. The method according to claim 1 wherein a centrifugal action is used for solid-liquid separation and spraying and separation of excess solution or suspension essentially takes place simultaneously.

9. The method according to claim 1 wherein drying is carried out at a temperature at least temporarily above the melting point of sodium perborate of the formula $NaBO_2.H_2O_2.3H_2O$, wherein the crystallisation water is at the same time partially or completely removed.

10. The method according to claim 1 wherein from 0.1 to 0.2% by weight of boron based on the weight of sodium percarbonate is deposited on said core.

11. The method according to claim 1 wherein no intermediate drying stage is carried out.

12. The method according to claim 1 wherein the diameter of sodium perborate in a suspension of particles thereof is smaller than the diameter of sodium percarbonate particles.

13. The method according to claim 1 wherein an alkali silicate free sodium borate is used.

14. The method according to claim 1 further comprising drying said sodium percarbonate after spraying with said sodium borate at a temperature sufficient to melt sodium perborate tetrahydrate so as to obtain a coating of sodium perborate as $NaBO_2.H_2O_2$.

15. A method for the preparation of stabilized sodium percarbonate formed of a sodium percarbonate core and a coating containing sodium perborate of the formula $NaBO2.H_2O_2.nH_2O$, wherein n is 0, 1, 2 or 3 comprising spraying a wet sodium percarbonate salt with 5 to 100 l of the solution or suspension containing sodium perborate per 100 kg of the wet salt, the sodium perborate content of which, expressed as $NaBO_2.H_2O$ is from 15 to 450 g/l, and separating excess solution or suspension simultaneously or subsequently from solid, wherein said separating is carried out by a centrifuge.

16. The method according to claim 15 wherein said centrifuge is a screen conveyor or push type centrifuge and takes place simultaneously.

17. A method for the preparation of stabilized sodium percarbonate comprising forming a sodium percarbonate core by reacting sodium carbonate with hydrogen peroxide in aqueous phase, crystallizing the resulting sodium percarbonate to obtain a wet sodium percarbonate having mother liquor adhering thereto, spraying said wet sodium percarbonate salt with 5 to 100 liters of a solution or suspension containing sodium perborate per 100 kg of said wet salt, the sodium perborate content of which, expressed as $NaBO_2.H_2O_2$ is from 15 to 450 g/l, displacing the mother liquor adhering to said wet sodium percarbonate salt by said solution or suspension of sodium perborate so as to completely coat said sodium percarbonate with a coating containing sodium perborate of the formula $NaBO_2.H_2O_2.nH_2O$, wherein n is 0, 1, 2 or 3.

18. The method according to claim 17 wherein said displacing is carried out with a solid-liquid separator after or during spraying with said solution or suspension.

19. The method according to claim 17 further comprising carrying out said spraying in the same solid-liquid separator where the mother liquor is displaced from the sodium percarbonate salt.

* * * * *